Jan. 14, 1958  R. E. GOODLING  2,819,942
PHOTOFINISH CAMERA AND DIRECT READING PHOTOGRAPHING TIMER
Filed Dec. 21, 1953  4 Sheets-Sheet 1

INVENTOR
RICHARD E. GOODLING
BY *Strauch, Nolan & Diggins*
ATTORNEYS

Jan. 14, 1958   R. E. GOODLING   2,819,942
PHOTOFINISH CAMERA AND DIRECT READING PHOTOGRAPHING TIMER
Filed Dec. 21, 1953   4 Sheets-Sheet 2

INVENTOR
RICHARD E. GOODLING

BY Strauch, Nolan & Diggins
ATTORNEYS

Jan. 14, 1958  R. E. GOODLING  2,819,942
PHOTOFINISH CAMERA AND DIRECT READING PHOTOGRAPHING TIMER
Filed Dec. 21, 1953  4 Sheets-Sheet 3

INVENTOR
RICHARD E. GOODLING
BY Strauch, Nolan & Diggins
ATTORNEYS

Jan. 14, 1958 R. E. GOODLING 2,819,942
PHOTOFINISH CAMERA AND DIRECT READING PHOTOGRAPHING TIMER
Filed Dec. 21, 1953 4 Sheets-Sheet 4
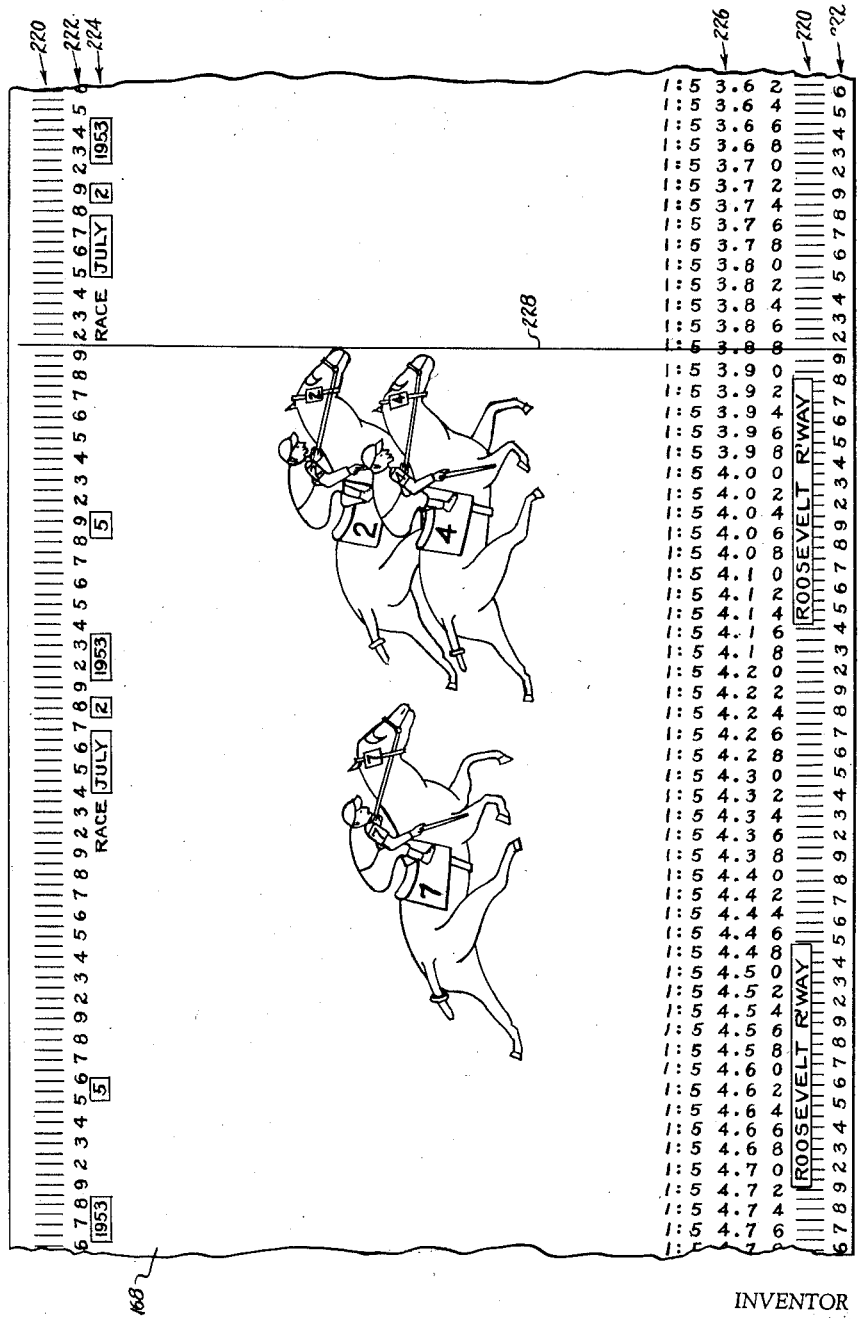
INVENTOR
RICHARD E. GOODLING
BY Strauch, Nolan & Diggins
ATTORNEYS United States Patent Office 2,819,942
Patented Jan. 14, 1958

2,819,942

PHOTOFINISH CAMERA AND DIRECT READING PHOTOGRAPHING TIMER

Richard E. Goodling, Hempstead, N. Y., assignor to Crowley-Jones Camera Corp., Hempstead, N. Y., a corporation of Florida Application December 21, 1953, Serial No. 399,547

5 Claims. (Cl. 346—107)

This invention relates to timers and more particularly to timers wherein time elapsing, for example from the start to finish of a racing contest, is progressively displayed and the combination thereof with a photofinish camera for photographically recording the displayed timers on a film along with and in predetermined relation to images of the participants, as they cross the finish line of the race course.

The invention is particularly adapted for use with "strip film" photo-finish cameras and is herein disclosed in conjunction with the specific type of strip film photo-finish camera disclosed in United States Letters Patent No. 2,482,621 to J. J. Jones. In cameras of this type, the contestants crossing the finish line are photographed through a narrow vertical slit onto a strip of film being drawn past the slit at approximately the same speed as the contestants taking into account the object-image ratio. Consequently, the images of the contestants are formed progressively as they pass the field of view of the camera and the film strip passes the slit.

The camera comprises a main objective lens which focuses the image through the slit onto the central area of the front face of the film; an indicia bearing cylinder constructed, arranged and driven at a constant speed of approximately one revolution per second to assure an image speed approximately equal to the film speed; a pair of secondary objective lenses adapted to record the indicia of the cylinder adjacent the respective edges of the front face of the film strip; and a manually operable focal plane shutter for making a still photograph or snapshot of the actual finish line on the central area of the front face of the film.

The indicia on the cylinder include equally circumferentially spaced parallel lines, the end portions of which are recorded on the edges of the film strip during operation of the camera, and suitable calibrations, recorded adjacent the edges of the film but laterally offset inwardly from the recorded lines, dividing the cylinder periphery into five equal parts. Due to the fact that the cylinder as presently preferred makes one complete revolution per second, the calibrations will indicate one fifth of a second intervals on the exposed film from which it is possible to estimate the time intervals separating the contestants at the finish line. However, no indication is given of total running time on the film of the Jones patent.

Accordingly, the primary object of this invention is to provide a simple, compact timer unit associated with a photo-finish camera for photographically recording on a limited area of a film strip the total running time of each of the participants in a racing contest in juxtaposition to the images of the contestants.

Another object of the invention is the provision of a photographic optical system for simultaneously recording separate images of different objects from opposite sides of a film strip.

A more specific object of the invention is the provision of a photographic timer unit which records the running time of a racing contest through the back of a film strip while an image of the participants is being simultaneously recorded from the front of said strip by a camera whereby the timer unit may be mounted on the camera housing in a convenient, unobtrusive location to the rear of the main objective lens.

Another object of the invention is to provide a timer unit wherein elapsed time is measured and recorded directly in minutes, seconds and fractional parts, tenths and hundredths, of a second.

A further object of the invention is to provide a compact, substantially self-contained photographic timing unit which can be easily mounted on and operatively connected into an existing strip film type photo-finish camera.

A still further object of the invention is to provide a combination strip film photo-finish camera and timer assembly wherein the position of the contestant at the finish of a race can be quickly, easily and precisely related to elapsed time indicia on the edge of the film strip for accurately determining the total running time of each contestant and the intervals therebetween.

These and other subordinate objects and advantages of the invention will be apparent to those conversant with the art from a reading of the following description of a preferred mechanical embodiment thereof in conjunction with the subjoined claims and annexed drawings in which:

Figure 6 is an enlarged fragmental view of the counter, partly in section, with portions of the housing broken away to show internal mechanical details;

Figure 7 is an elevational view of a portion of the film strip record produced by the photo-finish camera and timer unit of this invention.

Figure 1:
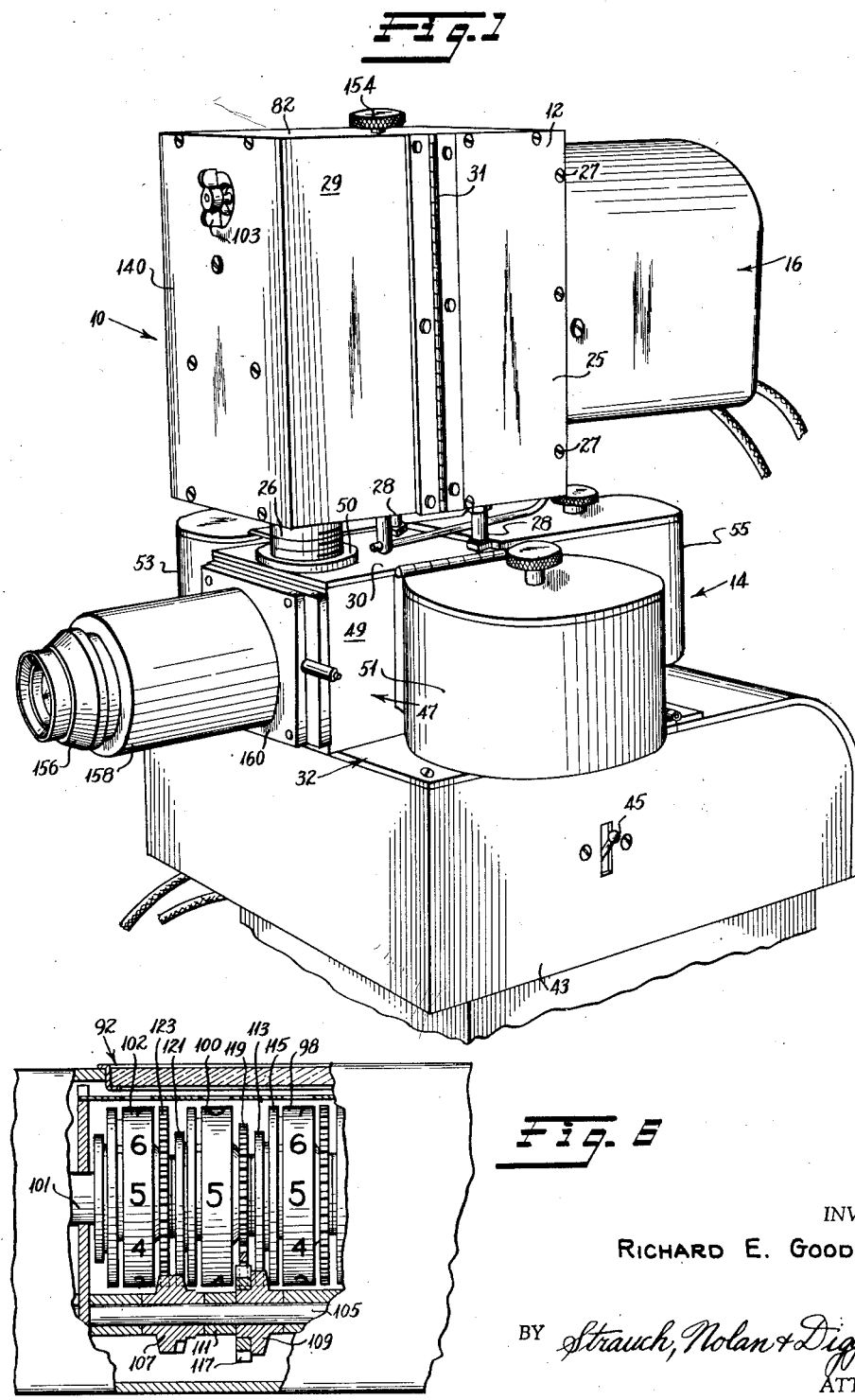
Figure 1 is a perspective side elevation of a timer unit according to the present invention mounted on a film strip photo-finish camera.

With continued reference to the drawings and first, in particular, to Figure 1, reference numeral 10 indicates generally a preferred structural embodiment of the timer unit of the invention comprising a light-tight housing 12, mounted upon a strip film photo-finish camera 14, in a manner hereinafter described and enclosing the majority of the operative parts of the timer mechanism. At the rear of the housing 12, a removable hood 16, encloses a constant speed motor 18, Figure 2, mounted on a bracket 20 secured to the rear panel 22 of the housing as by nut and bolt assemblies 24 (one shown).

The timer unit housing 12 includes side closures comprising a fixed panel 25 secured to the main housing structure by screws 27 and a door panel 29 secured to fixed panel 25 by a hinge 31 so that it can be swung open to provide access to the interior of the housing. Similar panels (not shown) are preferably provided on the opposite side of the housing and in reversed position regarding the fixed and swingable panels. Suitable latch means (also not shown) are preferably provided to maintain the swinging panels in closed, light-tight position.

The timer unit is mounted on camera 14 by means of a tubular adapter 26, which also serves as a lens mount and projection passage connecting the timer and camera as will hereinafter appear, and a pair of parallel crusher tubes 28 (one shown, Figure 2) interposed between the removable top cover 30 of camera case 32 and the bottom wall panel 34 of timer unit housing 12. Tubes 28, housing 12 and camera case cover 30 are relatively positioned and rigidly secured together by bolts 36 passing upwardly through the tubes 28 and suitable aligned apertures 38 and 40 in the cover 30 and bottom timer panel 34, respectively, and having nuts 42 threaded to the upper ends thereof.

If desired, crusher tubes 28 may be replaced by jam nuts (not shown) threaded on the shanks of screws 36 beneath panel 34 so as to clamp it against nuts 42.

Referring to Figure 1, camera housing 32 comprises a base section 43 containing a film transport or camera drive motor, not shown, and necessary gearing. A manually operable on-off toggle switch 45 on the side of the base section controls selective starting and stopping of the camera motor and preferably, as will be hereinafter explained, certain operative elements of the timer unit. The camera housing 32 also comprises an upper section 47 consisting of a central exposure chamber 49, a film supply spool compartment 51, a calibrating compartment 53 containing the aforementioned cylinder and lens for recording finish line constructing and proving indicia on the edges of the film strip as fully explained in Patent No. 2,482,621, and a take-up spool compartment 55.

Tubular member 26 supporting the forward end of the timer unit on camera cover 30 is internally and externally threaded and extends through aligned apertures 44 and 46 (Figure 2) in the camera cover 30 and bottom panel 34 of housing 12, respectively. A radial flange 48 of larger diameter than aperture 44, is provided on the lower end of the tubular member 26 and coacts with an internally threaded collar 50 to clampingly secure the tubular member to cover 30. A pair of similar internally threaded collars 52 and 54 are threadedly disposed on the upper end of the tubular member and coact to clamp wall 34 of the timer unit housing thereto. Thus, the timer unit may be securely and easily detachably mounted on the camera cover which in turn is removably secured to upper camera housing section 47 by suitable existing means, not shown. As will be appreciated, the only modification to an existing camera housing necessary to mount the timer housing is the provision of apertures 38 and 44 in the cover thereof.

As clearly appears in Figure 2, the timer unit housing contains a horizontal interior partition 56 dividing it into a lower compartment 58 containing a lens and shutter assembly and an upper compartment 60 containing gearing, a counter and illuminating means all identified and described in detail hereinbelow. Constant speed motor 18, mounted on the rear panel of the timer unit housing by bracket 20 as already explained, comprises a motor spindle or drive shaft 62 extending through a suitable aperture 64 in rear panel 22 of housing 12 and has its forward end journalled in a suitable bearing 66 pressed or otherwise provided in a vertical transverse interior partition 68 of the housing. Suitable light-seals are provided at all points where necessary, that is, for example where a shaft projects through the timer housing, in order to maintain light-tightness.

A spur gear 70 is non-rotatably fixed, as by a set screw 71, to the motor spindle intermediate vertical partition 68 and the rear panel 22 of the housing and meshes with a second spur gear 72 similarly non-rotatably fixed to a shaft 74 disposed parallel to the motor spindle and having its rearward end journalled in a suitable bearing 75 in the back panel 22 of the timer housing and its forward end journalled in and projecting through another bearing (not shown) in vertical partition 68. A spiral bevel gear 76 fixedly secured to the forward end of shaft 74 as by set screw 77 meshes at right angles with a complementary spiral bevel gear 78 non-rotatably fixed as by set screw 79 to a vertical shaft 80 having an upper end journalled in the top panel 82 of housing 12 and its lower end journalled in horizontal partition 56.

Figure 4:
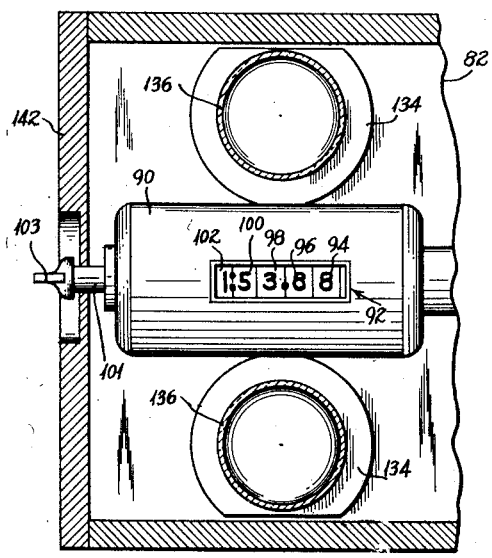
Figure 4 is a fragmental section on line 4—4 of Figure 2 looking in the direction of the arrows.

Fixed to or integral with shaft 80 above gear 78 is a worm pinion 84 meshing with a worm gear 86 on the end of a drive shaft 88 of a chronometric counter 90 secured to the upper panel of the housing 12, in any suitable manner with the register or dial window 92 (Figure 4) facing downwardly. The entire internal mechanical structure of the counter is not essential to a proper understanding of the invention. However, the portion of the counter structure which is novel and germane to the present invention will now be described. The counter movement is of the well known revolution type and comprises five digit wheels; a hundredths (of a second) wheel 94; a tenths (of a second) wheel 96; two seconds wheels 98 and 100; and a minute wheel 102 from right to left as shown in Figure 4. Each of wheels 94, 96, 98 and 102 are peripherally divided into ten equal parts inscribed with consecutive digits from 0 to 9 in conventional manner. Wheel 100, however, is novelly divided into six equal parts numbered with consecutive digits from 0 to 5. The internal counter mechanism (not shown) and the drive gearing 70, 72, 76, 78, 84 and 86 is such that with the motor operating at its preselected constant speed in the normal course of operation as hereinafter described, digit wheel 94 makes 600 revolutions per minute. Having 10 digits wheel 94 registers 100 readings per second, i. e., each step of the wheel registers 1/100 (.01) of a second. Digit wheel 96 is conventionally connected to advance in steps of 1/10 of a revolution for every complete revolution of wheel 94, i. e., 60 revolutions per minute and, therefore, its ten digits give 10 readings a second, each measuring 1/10 (.1) of a second. Wheel 98, also calibrated with ten digits, is conventionally connected to advance in steps of 1/10 of a revolution for every revolution of wheel 96, or one digit per second measuring full seconds. Wheel 98, calibrated with only 6 digits, however, is novelly connected to advance in steps of 1/6 of a revolution for every revolution of wheel 96, i. e., one digit in tens seconds. It consequently measures time in increments of ten seconds and cooperates with wheel 96 to record whole seconds from 1 up to a maximum total of 59. Minute wheel 102 is conventionally connected to advance in steps of 1/10 of a revolution for each revolution of second wheel 102, i. e., one step per minute and records whole minutes elapsed. Preferably, the face of the counter register window is marked with a colon (:) between wheels 100 and 102 and a decimal point (.) between wheels 96 and 98 to facilitate reading.

From the foregoing description, it will be understood that, starting with the counter dials set at a normal initial reading of 0:00.00, wheel 94 advances in 1/100 second steps up to 0:00.09 whereupon, as it moves to its next step (zero), tenths wheel 96 advances one step to record 1/10 second elapsed time thus 0:00.10. Wheel 94 continues to register one-hundredths up to 0:00.09 giving with wheel 96 successive readings of 0:00.10, 0:00.11, 0:00:12, etc., up to 0:00:99. Upon reaching 0:00.99 the wheels 94 and 96 move together to zero and seconds wheel 98 advances one step to record 1 full second of elapsed time e. g., 0:01.00. Again the sequence continues until the dial reads 0:09.99 i. e., nine and ninety-nine one-hundredths seconds when wheels 94, 96 and 98 move together to zero and seconds wheel 100 advances one 60° step to give a reading of 0:10.00 (ten seconds). Because wheel 100 carries only 6 digits, it will advance one step every ten seconds up to 0:59.99 and then wheels 94, 96, 98 and 100 move together to zero as the minute wheel advances one step to record one minute of elapsed time thus: 1:00.00. The progressive readings in one-hundredths of a second steps approaching and passing 1 minute being as follows: 0:59.98, 0:59.99, 1:00.00, 1:00.01, 1:00.02. It will be appreciated, therefore, that the counter register gives progressive visual indication of elapsed time readable directly in minutes, seconds and tenths and hundredths of a second without the converting calculations required with conventional, non-direct reading counters which employ a decimal system throughout and consequently read only in multiples and fractions of seconds. The counter dials are re-set to zero or a preselected initial position by means of a shaft 101 extending to the exterior of housing 12 where it is provided with a wing nut 103.

From the foregoing description of the register dials and the operation thereof, it will be appreciated that insofar as counter wheels 94, 96, 98 and 102 are concerned, these wheels incribed with ten digits advance in 10 thirty six (36°) degree steps in order to complete a revolution, the advancing mechanism can be of any conventional counter transfer adapted to effect such operation. However, inasmuch as wheel 100 is divided into only six equal parts and is inscribed with only six digits and therefore must advance in six 60° steps to complete one revolution, a novel and unique advancing mechanism is required between it and the adjoining ten step wheel 98. The novel counter wheel drive mechanism devised to achieve this unique relation is shown in and will be now described with reference to Figure 6 wherein reference numeral 105 indicates a pinion shaft fixed in the counter-housing and on which are rotatably mounted in conventional axially spaced relation a number of transfer pinions including pinion 107 and a transfer gear assembly with which we are now concerned including pinion 109. Suitable spacers such as 111 are provided between the pinions to maintain them in operative relation to the respective counter wheels on which they operate. Pinion 109 has the conventional eight teeth operatively associated with a two tooth transfer gear 113 fixed to wheel 98 by means of locking disk 115. Every revolution of wheel 98 will, therefore, revolve pinion 109 90°. This pinion, unlike the conventional pinion, also has a sixteen tooth gear 117 staked to it so that a 90° arc will move four teeth on this gear which in turn will move four teeth on a novel twenty-four tooth drive gear 119 staked to wheel 100. By moving the twenty-four toothed gear 119 four teeth, an arc of 60° will be traversed which will be the one step increment of movement required to display the next character on the wheel 100.

Wheel 100 also carries a conventional two toothed transfer gear 121 which meshes with conventional transfer pinion 107 which has eight teeth. Therefore, wheel 100, when completing one revolution, will move pinion 107 90° even though wheel 100 itself moves only 60°. When pinion 107 moves 90° wheel 102, which has a standard twenty toothed drive gear 123 attached to it, will move 36°. Thus counter 90 will record up to 9:59.99 and then go to all zeros unless it is reset first.

The reset mechanism of the counter forms no part of the invention and, therefore, is not described. However, in operation resetting is accomplished by pressing shaft 101 inwardly and rotating it 360°. This action disengages the pinions from the drive gears attached to the counter wheels and allows the wheels to return to zero at which position the transfer pinions reengage the drive gears thereof.

Referring again to Figure 2, a spur gear 104 is non-rotatably mounted on shaft 80 adjacent its lower end and above portion 56 and meshes with a preferably fiber idler spur gear 106 mounted, for free rotation about an axis parallel to shaft 104, on a stub shaft 108. Shaft 108 is secured to or integral with and projects upwardly from an adjustment plate 110 (Figure 3) mounted on partition 56 by means of a plurality of screws 112 passing through elongated or oversize apertures 114 in the plate so constructed and arranged that, by loosening the screws the plate may be selectively adjusted to shift the axis of idler gear 106 relative to the gears meshing therewith to eliminate lash.

A shutter drive shaft 116 has its lower end rotatably journalled in the bottom panel 34 of the timer housing and its upper end journalled in and projecting through partition 56. Shaft 116 is provided with a spur gear 118 drivingly secured to the shaft and meshed with idler gear 106. A rotary shutter disk 120, the operation and further structural details of which are hereinafter described, comprises a central hub or collar 122 containing a radial set screw 124 by means of which it is fixed to shaft 116 for coaxial rotation therewith.

The optical system by means of which the image of the face 92 of counter 90 is photographically recorded will now be described with particular reference to Figures 2, 3 and 5.

The upper end of tubular member 26, internally threadedly receives an externally threaded lens adapter 126, having its upper end internally threaded to receive a standard, mounted lens 128 of suitable diameter and focal length and having the usual iris for adjusting the lens aperture. Lens 128, is directed at and focused on the register of counter 90 through a suitable aperture 130 provided in partition 56 coaxial with the optical axis of the lens. A conical lens hood 132 is provided on the lens to prevent stray light or reflections from falling on the lens.

The upper compartment 60 of housing 12 contains a pair of lamp sockets 134 secured, by any suitable means (not shown) to the underside of top housing panel 82 and spaced laterally to each side of and preferably with their centers in a vertical plane through the optical axis of lens 128 and the center of aperture 130. Sockets 134, conveniently but not necessarily of the bayonet type, are adapted to receive suitable electric lamps 136 selected in accordance with standard practice involving considerations of such factors as film sensitivity, lens speed, etc. in order to provide photographically correct and adequate illumination of the face 92 of counter 90. As shown in Figure 3, a pair of spaced parallel shade webs 138 are provided in housing 12 between the lamps 136 and on each side of aperture 130. Webs extend rearwardly from front panel 140 of the housing to a point beyond the most remote edge of aperture 130 and upwardly from partition 56 approximately halfway to counter face 92. The precise dimensions of the webs varies with the particular installation but in any case they are such as to prevent the light emitted by lamps 136 from falling directly on aperture 130 and reaching lens 128.

The ends of webs 138 remote from front panel 140 are inclined upwardly and away from aperture 130 and have fastened therebetween the lower portion of a similarly inclined transverse reflector 142 which extends upwardly from partition 56 toward the top housing panel 82. The reflector ends extend laterally beyond each of webs 138 and behind each of the lamps 136 so that light therefrom is reflected upwardly toward the counter to provide optimum illumination. Lamps 136 are supplied with current through a suitable electric circuit (not shown), preferably arranged so that energization is controlled conjointly with energization of the camera motor by manipulation of switch 45, and independently of timer motor 18.

Rotary shutter disc 120, coaxially fixed to shaft 116 as hereinbefore mentioned, is positioned in horizontal parallelism to and immediately subjacent partition 56 and is of great enough diameter to normally occlude aperture 130. The disc contains a sector shaped radial exposure slot 143 at one point on its periphery to provide intermittent exposure of aperture 130 as the disc revolves with shaft 116 in the course of normal operation. A balancing weight 144 on the disc is so proportioned and located as to dynamically balance the disc by compensating for the asymmetrical mass distribution occasioned by the exposure slot. The ratio of counter and shutter drive gearing according to the presently disclosed embodiment is such that shutter disc 120 revolves at the rate of 3000 R. P. M. while the hundredths wheel 94 of the counter is driven at the rate of 600 R. P. M. and, being divided into 10 parts gives 6000 readings per minute. With a single exposure slot 143, therefore, the counter face is photographed once every .02 of a second as will be seen from timer readings 226 on the sample film record strip shown in Figure 7, hereinafter described in detail.

It will be understood, however, that certain variations may be resorted to regarding the relative speed of the shutter disk and the number of exposure apertures or slots 143 therein. Thus, at a speed of 3000 R. P. M., two diametrically opposite exposure slots may be utilized in order to achieve a reading every .01 second if desired. It is necessary, however, that the rotational speed of the shutter be large enough and the circumferential dimension of the slot small enough to "stop" the movement of the wheels to avoid blurring of the image produced and that the shutter and counter be adapted to be set and maintained in a synchronized relation so that exposures are made only when the digits on all wheels which constitute any particular reading are aligned, that is so that the exposure will not be made while any wheel of the timer is advancing from one digit to another.

A shutter brake 146 is secured to the bottom panel of housing 12 by means of screws 148 and comprises a right angularly extending arm 150 carrying and resiliently maintaining a friction pad 152 of suitable heat-resistant material in contact with the shutter drive shaft 116 thus minimizing the effects of any lash which might be present in the gearing after adjustment of idler 106 and eliminating the tendency of the shutter to "coast."

The upper end of shaft 80 projects through the top of the housing and is provided with a knurled thumb knob 154 whereby the shutter disc, operatively connected to shaft 80 by gears 104, 106 and 118, can be reset to starting position as will appear in the description of the operation of the invention hereinbelow.

Figure 2:
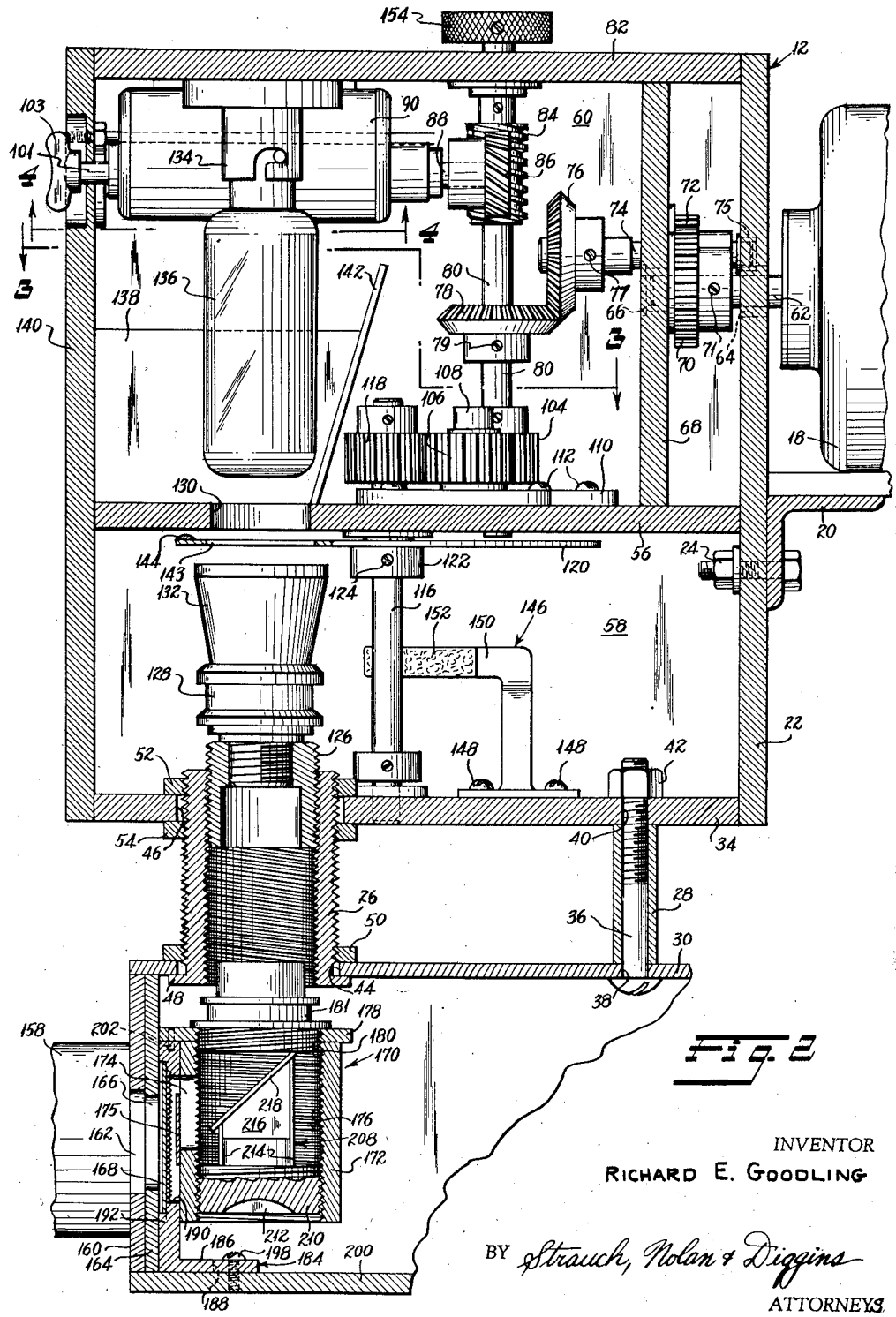
Figure 2 is a fragmental vertical sectional view of the timer unit and camera showing the internal structure.
Figure 3:
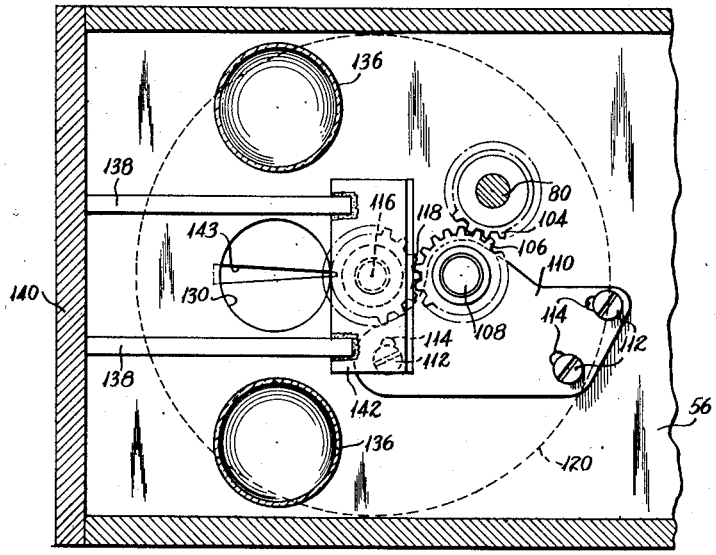
Figure 3 is a fragmental section on line 3—3 of Figure 2 looking in the direction of the arrows.

As shown in Figures 1 and 2, camera 14 includes a main objective lens 156 mounted in a lens barrel 158 which is suitably secured to a mounting plate 160 fastened to the front end of exposure chamber 49 of camera case 32 and containing an aperture 162 coaxially aligned with the lens barrel. Behind mounting plate 160 is an aperture plate 164 containing the characteristic strip camera narrow vertical exposure slit 166 through which the contestants are photographed.

Reference numeral 168 designates an exaggerated representation of the film strip which is drawn past slit 166 in normal operation of the camera with the emulsion side toward the aperture plate as fully explained in the aforementioned Patent No. 2,482,621. According to the present invention, the pressure roller (member 35 in said patent) for keeping the film strip in proper position behind the main objective slit aperture 166 is replaced by a secondary objective lens, film guide and slit aperture assembly designated generally by reference numeral 170. Assembly 170 comprises a cylindrical member 172 open at the bottom and containing a rectangular aperture 174 located in the sidewall thereof. Aperture 174 should be as small as possible and still allow free passage of the counter image, which is projected therethrough as will hereinafter be seen, in order to control stray light and unwanted reflections. The exact size of the aperture depends on the amount of image reduction required and, therefore, would vary in actual practice. In the presently disclosed embodiment, the aperture is roughly .028 inch wide and .140 long (vertically). However, from a standpoint of location and manufacture, it has been found inexpedient to cut an exactly sized and positioned aperture and accordingly, it is preferably formed oversized and partially covered with a thin vinyl tape 175 or like material according to the results of photographic tests. In this manner, the final slit aperture is dimensioned and positioned to give the precise image reduction and location desired. For this reason, the aperture is shown in its normal unadjusted condition in Figure 5 and, in Figure 2 as it appears finally.

Figure 5:
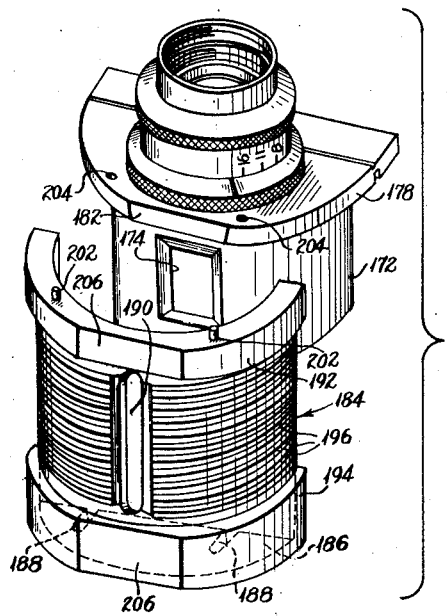
Figure 5 is a perspective elevation on an enlarged scale showing the structure assembly for guiding the film strip and mounting one of the lens of the optical system for recording the timing calibrations thereon.

Referring to Figures 2 and 5, cylindrical member 172 contains a threaded axial bore 176 and is provided at its upper end with a semi-circular plate 178 containing a threaded aperture 180 coaxial with bore 176 and adapted to receive a standard, mounted lens 181. As will be more fully appreciated as this description proceeds, lenses 181 and 128 coacts to form an image of the counter face 92. While they are standard lenses, per se, they are selected and combined to obtain extremely wide-angle focus and a relatively large image reduction, 18 to 1 in the presently disclosed embodiment.

Plate 178 is so dimensioned that its forwardly-facing arcuate portion projects peripherally beyond and generally conforms to the curve of the cylindrical walls of member 172, thus providing a substantially semi-annular flange symmetrically disposed with respect to the vertical centerline of aperture 174. The arcuate forward edge of plate 178 is flattened as indicated at 182 in a plane parallel to the plane of aperture 174 for a purpose hereinafter appearing.

Cylindrical member 172 is supported and mounted in the camera exposure chamber 49 by means of a semi-cylindrical film guide member 184 having a semi-circular bottom plate 186 containing at least two parallel slots 188 (Figures 2 and 5) extending inwardly from its straight edge toward its arcuate periphery. Member 184 is provided centrally in its cylindrical wall with a narrow, vertical aperture slit 190 which faces forwardly and is registered with aperture 174 of member 172 when the respective members are assembled in the chamber 49 of the camera housing. In this regard, it is pointed out that aperture 166 is longer (vertically) than aperture 174 and while both are axially aligned in a vertical plane through the optical axis of main objective lens 156, they are vertically offset for a purpose which will presently appear. The upper and lower ends of guide member 184 are thickened to define arcuate, parallel guide flanges 192 and 194 spaced to guidingly accommodate the width of the film strip 168 between them. Thus aperture 166 spans the major portion of the film strip between its longitudinal edges and aperture 174 spans an aligned portion adjacent one edge thereof.

The forwardly facing (convex) surface of film guide member 184 between flanges is provided with corrugations 196 running parallel to the flanges so as to minimize the area of surface contact between the guide member and the film strip.

Film guide 184 is mounted within and secured to the bottom of the camera housing by means of screws 198 (one shown, Figure 2) passing through slots 188 and threaded into suitable tapped holes in the bottom panel 200 of housing 32. Thus by loosening screws 198 member 184 can be moved toward and away from the main objective lens for threading the film strip as will more fully appear.

Cylindrical member 172 is supported on the film guide 184 by the overhang of plate 178 which rests on the upper edge of the film guide flange 192. A pair of locating pins 202 on flange 192 and matching locating holes 204 in the flange portion of plate 178 coact to achieve and maintain proper relative positioning of respective elements 172 and 184. As clearly appears in Figure 5, flanges 192 and 194 are provided with "flats" 206 corresponding to "flat" 182 on plate 178 so that, when elements 172 and 184 are assembled, the "flats" will be in a common vertical plane and abut the rear surface of main objective aperture plate 164 when film 184 is moved forwardly and, in this manner limit the forward movement of the assembly 170 and automatically align the axis of apertures 178 and 190 substantially perpendicular to plate 164 and align the optical axes of lenses 128 and 181.

Referring again to Figure 2, an image refracting assembly designated generally at 208 is provided in bore 178 and comprises a circular threaded plug 210 containing a tool-receiving kerf 212 in its underside and a pair of parallel support plates 214, rigidly united by pair of parallel right-triangular webs 216, secured to its upper surface. Plate 214 and webs 216 form a support pedestal on which is mounted an optically ground plane mirror 218 with its reflective surface uppermost and disposed at an angle of 45° to the optical axis of lenses 128 and 181 so as to refract the image formed thereby 90° forwardly (counterclockwise in Figure 2) and through aperture 174. It will be understood that a right angular optical prism suitably mounted may be used in place of mirror 218 to achieve the same result.

The pitch of the threads in bore 176 and on plug 210 is sufficiently small so as to allow fine adjustment of the vertical position of the reflective element 218 through multiples of full turns of plug 210 by means of a suitable tool engaged in kerf 212. This adjustment in conjunction with the adjustment of aperture 174 by means of tape as already fully explained, allows a high degree of control regarding the exact size and location of the counter image projected on the film strip.

As mentioned, the timer unit is used in conjunction with a strip film photofinish camera and to best advantage with one of the type described in the aforementioned Patent No. 2,482,621 as will hereinafter be explained.

*Loading*

The timer unit is self-contained within housing 12 except for assembly 170 which is mounted within the camera case 32. The cover 30 of camera case 32, with the timer unit mounted thereon, is removable as a unit to load the camera with film. The threading procedure would normally be the same for the particular camera employed as it would be without the timer unit. In the camera shown, the supply spool is in compartment 51, and the film is suitably guided behind the main object lens 156 and through compartment 53 containing the mechanism described in Patent 2,482,621 for recording the various indicia on the edges of the film strip, and finally to a take-up reel in compartment 55.

Referring to Figure 2, with camera case cover 30 removed, the film strip is run between guide flnages 192 and 194 by merely lifting member 172 off film guide 192 so that screws 198 are accessible from above. These screws are loosened and member 184 moved back to provided sufficient clearance between it and plate 164 to slip the film in from above and position it between the flanges 192 and 194 whereupon member 192 is returned to position, with flats 182 and 206 abutting plate 164 whereupon screws 198 are re-tightened and member 172 slipped back in place. Thus the film passes between main objective aperture plate 164 and guide plate 192 with the emulsion side toward plate 164.

*Operation*

With the camera mounted and proven as described in Patent 2,482,621, the optical axis of the main objective lens is in alignment with the finish line of the race course. The shutter disc is set to its zero position by manipulation of knob 154. The counter is also set to zero reading by means of wing nut 103, or if necessary to compensate for the instant required for the timer motor 18 to reach its rated constant speed, a suitable initial reading is present on the counter. The necessity for correction and the amount required can be determined experimentally and would remain a constant factor and can be minimized or eliminated by use of lightweight gears and shafting to reduce inertia.

The timer motor is started simultaneously with the start of the race, for example, by means of an electrical circuit (not shown) related to the starting gate or signal, but the camera or film transport motor is not started and the lamps 136, preferably controlled by a common switch 45 with the film transport motor, remain off. Thus motor 18 drives counter 90 through gears 70, 72, 76, 78, 84 and 86 to register the elapsing time and drives shutter disc 120 through gear train 104, 106 and 108 to keep it in its predetermined relation to the counter readings.

As the contestants approach the finish line, the film transport motor is started, at the same point as is customary in such cameras without the timer unit, and simultaneously, either manually or by interconnection, mechanical or electrical, with the motor switch 45, lamps 136 are turned on. Consequently, the counter face is illuminated and its image transmitted through lenses 128 and 181 and reduced in size (18 times in the lens combination depicted in the disclosed embodiment and projected on the reflective surface of the mirror or prism whence it is reflected through aperture 174 which "crops" or masks off extraneous portions thereof to eliminate all but the numerals of the counter and the areas of the counter face therebetween, and through aperture 190 and the transparent film backing to its photosensitive emulsion at a preselected point near the edge of the film.

It will be understood that, simultaneously, the main objective lens 156 is projecting the image of the contestants as they cross the finish line on the central portion of the film strip from the front or emulsion side and further indicia are recorded along the edges of the strip by the mechanism and an independent lens system (not shown but fully described in Patent No. 2,482,612) contained in compartment 53.

A portion of the record strip resulting from developing and projection printing of the film strip appears as in Figure 6 wherein arrows 220, 222 and 224 indicate, respectively, calibrations for constructing a finish line; corresponding numerals for matching said calibrations; and miscellaneous data for identifying the particular race and race course in question. Arrow 226 indicates the series counter readings progressively recording the time elapsed from the start of the race to the precise instant when the particular segment of film bearing each reading passed the apertures 162 and 174. Since the contestants are progressively recorded in the exact relative positions in which they cross the finish line, hypothetical finish lines 228 constructed in provable parallelism to the actual finish line (not shown) according to the disclosure at Patent No. 2,482,621 and tangent to the foremost part of each contestant, indicate counter reading on the edge of the strip which shows the total running time of each directly in minutes, seconds, and tenths and hundredths of a second.

For example, in Figure 7 it can be easily determined that the time of the winning horse (number 2) was 1 minute and 53.88 seconds, of the second running horse was 1 minute 53.89 seconds and of the third horse was 1 minute 54.23 seconds.

The accuracy with which the counter reading can be related to each contestant is enhanced by the provable accuracy with which hypothetical or constructed finish lines can be drawn and consequently, the timer is particularly advantageously applied to cameras producing record strips in which this is possible. However, it will be appreciated that fully satisfactory timing results can be obtained with any strip film type camera. The structural modifications required to operatively mount the timer unit, in any event, are of a minor nature amounting, for the most part, to drilling suitable holes in the existing camera case.

The unit is extremely compact and chiefly self-contained and since the timing images are photographed through the back of the film the unit can be mounted on top rather than encumbering the front of the camera.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An optical system for simultaneously progressively recording images of two independent objecitves in fixed relation to each other on a moving film strip comprising a light-tight housing structure; a pair of independent objective lens means operatively associated with said housing structure to form and transmit images of respective objectives thereinto along optical axes intersecting with in said housing at right angles; an aperture plate within said housing behind one of said objective lens means and intersecting the optical axis thereof; aperture means in said aperture plate; film guide means adapted to progressively position a moving film strip behind said aperture in a plane substantially parallel to said plate whereby the image formed by said one objective lens means is projected on one side of a film strip positioned by said guide means; a tubular member removably supported by said guide means on the opposite side thereof with respect to said aperture plate and in substantially coaxial alignment with the optical axis of the other of said objective lens means; reflecting means in said tubular member adapted to refract the image formed by said second objective lens means 90° toward said film guide means along a line of transmission parallel to the optical axis of said one objective lens means; and aperture means in said tubular member and film guide means to permit passage therethrough of the image formed by said second objective lens means to the other side of a film strip moving through said guide means; the apertures in said aperture plate and those in said tubular member and guide means being aligned in a plane through the optical axis of said one objective lens means but offset with respect to each other and of such size as to mask said imaages and confine them to laterally separate areas of the film strip.

2. The optical system defined in claim 1 wherein said other objective lens means includes a lens combination for obtaining extremely short, wide angle focus and image reduction sufficient to form an image occupying a very small proportion of the lateral area of the film strip as compared to the image formed by said one objective lens means; and wherein said film guide means comprises an arcuate plate having an axis of curvature parallel to and its convex side facing said aperture plate; spaced arcuate flanges on the convex side of said arcuate plate adapted to guidingly receive a film strip therebetween; flat surfaces on said flanges parallel to and normally abutting said aperture plate to guidingly confine a film strip between said arcuate plate and aperture plate, and means selectively operable to permit movement of said arcuate plate away from said aperture plate to accommodate the insertion and removal of a film strip therebetween.

3. The optical system defined in claim 2 wherein said lens combination includes a lens mounted on and removable with said tubular member to provide access to said selectively operable means.

4. A photofinish camera and photographing timer assembly comprising a camera housing having a main objective lens and aperture means in a side wall thereof for forming and continuously projecting images of contestants, passing through a narrow transverse area of a race course at the finish line in sequential order of their passage through said area, into said housing; a sensitized film strip moving past said main objective lens and aperture means at right angles to the objective axis at a speed substantially equal to the speed of movement of said images of said contestants and in the direction of movement of said images, said film strip being located within said housing means in position to photographically record said images of said contestants onto a central portion of said film strip and having oppositely related, aligned and respectively identified guide markings disposed along said film strip immediately adjacent the opposite longitudinal edges of said film strip; a film guide means comprising a member located on the side of said film strip opposite that exposed to said main objective lens and aperture means and mounting a second objective lens the optical axis of which is at right angles to the axis of said main objective lens and a reflecting means for reflecting the image formed by said second objective lens 90° towards said film strip along a path parallel to the optical axis of said main objective lens and aperture means; an opening in the wall of said housing in coaxial alignment with the optical axis of said second objective lens; an adapter secured in said opening and extending away from the wall of said housing; a light tight timer housing detachably mounted on said adapter and having an apertured partition therein dividing the timer housing into a shutter compartment and an objective compartment, the aperture in said partition being disposed in coaxial alignment with said tubular adapter element; a rotatable shutter mounted in said shutter compartment for rotation past the aperture of said partition in timed relation to said moving film strip and between said partition aperture and said tubular adapter member, said shutter having an exposure aperture therein for periodically exposing the view through said partition aperture to said second objective lens; a chronometric revolution type counter in said objective compartment having a face adapted to progressively visually display elapsed time readings in minutes, seconds, and preselected increments of one second to view through said partition aperture; and illuminating means in said objective compartment for constantly illuminating the face of said counter whereby said periodic exposures by said shutter and said second objective lens will form snapshot images of said elapsed time readings and project them onto said film strip adjacent one edge of said central portion thereby recording the time of the finish of each contestant on said film strip beside the respective contestants.

5. The combination defined in claim 4, including means for setting said shutter in a predetermined starting position and means for setting said counter at a preselected initial reading independently of said shutter setting means.

References Cited in the file of this patent

UNITED STATES PATENTS

| 1,722,935 | Messter | July 30, 1929 |
| 2,045,414 | Rumpel | June 23, 1936 |
| 2,169,011 | Wengel | Aug. 8, 1939 |
| 2,257,100 | Belock | Sept. 30, 1941 |
| 2,336,081 | Finnegan et al. | Dec. 7, 1943 |
| 2,482,621 | Jones | Sept. 20, 1949 |
| 2,641,523 | Beckman et al. | June 9, 1953 |
| 2,646,334 | Marchand | July 21, 1953 |